(12) United States Patent  
Durand et al.

(10) Patent No.: US 9,252,957 B2  
(45) Date of Patent: Feb. 2, 2016

(54) METHOD FOR PREVENTING LAUNDERING AND REPACKAGING OF MULTIMEDIA CONTENT IN CONTENT DISTRIBUTION SYSTEMS

(75) Inventors: Alain Durand, Rennes (FR); Marc Joye, Cesson Sevigne (FR); Mohamed Karroumi, Rennes (FR); Yan-Mei Tang Talpin, Saint Gregoire (FR)

(73) Assignee: Thomson Licensing (FR)

( * ) Notice: Subject to any disclaimer, the term of this patent is extended or adjusted under 35 U.S.C. 154(b) by 175 days.

(21) Appl. No.: 12/736,262

(22) PCT Filed: Apr. 7, 2009

(86) PCT No.: PCT/EP2009/002557  
§ 371 (c)(1),  
(2), (4) Date: Sep. 24, 2010

(87) PCT Pub. No.: WO2009/124715  
PCT Pub. Date: Oct. 15, 2009

(65) Prior Publication Data  
US 2011/0016311 A1      Jan. 20, 2011

(30) Foreign Application Priority Data  
Apr. 7, 2008    (EP) .................................... 08290337

(51) Int. Cl.  
*G06F 11/30*       (2006.01)  
*H04L 9/32*        (2006.01)  
*H04L 9/08*        (2006.01)

(52) U.S. Cl.  
CPC ............ *H04L 9/3247* (2013.01); *H04L 9/0836* (2013.01); *H04L 2209/60* (2013.01)

(58) Field of Classification Search  
CPC .................................. G06F 21/72; G06F 21/10  
USPC .......................... 713/189, 193, 161; 726/2, 3  
See application file for complete search history.

(56) References Cited

U.S. PATENT DOCUMENTS 5,673,316 A    9/1997    Auerbach et al.  
7,353,541 B1   4/2008    Ishibashi et al.

(Continued)

FOREIGN PATENT DOCUMENTS

WO    WO2006051043    5/2006

OTHER PUBLICATIONS

Advanced Access Content System: "Introduction and common cryptographic elements", Feb. 17, 2006, Revision 0.91, Intel Corporation, International Business Machines Corporation, Ltd, Matsushita Electric Industrial Co., Toshiba Corporation, Microsoft Corporation, Sony Corporation, The Walt Disney Company, and Warner Bros.

(Continued)

*Primary Examiner* — Anthony Brown  
(74) *Attorney, Agent, or Firm* — Jack Schwartz & Associates, PLLC (57) ABSTRACT

A method for distributing content in a content distribution system is disclosed which comprises the steps of: encrypting at a Content Packager a content using a content encryption key to generate an encrypted content; sending the content encryption key to a Licensing Authority; receiving from the Licensing Authority a distribution key containing an encryption of the content decryption key ($K_c$) for a given set of authorized devices; creating a secure link between the content encryption key ($K_c$) and the content protected by this content encryption key using a signature of the content; and distributing the encrypted content together with the signature of the content. A method for receiving content distributed according to the above-mentioned method in a device able to play back the content is also disclosed where the content signature is checked before any play back of the content.

18 Claims, 2 Drawing Sheets

Signing content and keys: $\Sigma_{cp} = \text{Sign}(sk_{cp}; M \| K_c \| K_d)$;  
Signing encrypted content: $\Sigma_{cp} = \text{Sign}(sk_{cp}; C)$;  
Encrypting using signature: $K_c = \text{Sign}(sk_{cp}; M)$.

Illustration of the solutions

(56) References Cited

U.S. PATENT DOCUMENTS

| | | | |
|---|---|---|---|
| 8,117,667 B2* | 2/2012 | Merkle et al. .................... | 726/29 |
| 2005/0097260 A1* | 5/2005 | McGovern et al. ........... | 711/100 |
| 2005/0120232 A1* | 6/2005 | Hori et al. ..................... | 713/193 |
| 2006/0206945 A1 | 9/2006 | Kato et al. | |
| 2007/0030974 A1* | 2/2007 | Ishibashi et al. .............. | 380/281 |
| 2007/0208668 A1 | 9/2007 | Candelore | |
| 2008/0199007 A1* | 8/2008 | Candelore ..................... | 380/201 |

OTHER PUBLICATIONS

Content Protection for Recordable Media: "Introduction and common cryptographic elements", 2000, Revision 0.94, Intel Corporation, International Business Machines corporation, Ltd, Matsushita Electric Industrial Co. and Toshiba Corporation.

Fiat et al: "Broadcast encryption", D.R. Stinson, Editor, in Advances in Cryptology, CRYPTO'93, vol. 773 of Lecture Notes in Computer Sciences, pp. 480-491, Springer-Verlag, 1994.

Gennaro et al: "How to sign digital streams", Information and Computation, 165(1): pp. 110-116, 2001, earlier version in Proc. of CRYPTO'97.

Naor et al: "Revocation and tracing schemes for stateless receivers", Advances in Cryptology, CRYPTO 2001, vol. 2139 of Lecture Notes in Computer Science, pp. 41-62, Springer-Verlag, 2001.

Intel, IBM, Matsushita, Microsoft, Sony, Toshiba, The Walt Disney Company, Warner Bros.Advanced Access Content System (AACS). Technical Overview (Informative). Jul. 2004.

Panasonic, Philips, SONYContent Protection System for Blu-ray Disc ROM Specifications Informational VersionVersion 0.9a, Apr. 2004.

Intel Corporation, IBM, Matsushita Electric Industrial Co., Ltd, Toshiba CorporationContent Protection for Recordable Media Specificationv 0.94, Oct. 18, 2000.

Philips and HPVidi Copy Protection System for the DVD+R/+RW Video Recording FormatMarch 2004, System DescriptionVersion 1.0.

Windows Media Licensing Programhttp://windows.microsoft.com/en-us/windows/windowsmedia-licensing.

Advanced Access Content System (AACS)Intel CorporationInternational Business Machines CorporationMatsushita Electric Industrial Co., Ltd.Microsoft CorporationSony CorporationToshiba CorporationThe Walt Disney CompanyWarner Bros.Revision 0.90 RC2Title: Pre-recorded Video BookMar. 17, 2005.

Intel CorporationInternational Business Machines CorporationMatsushita Electric Industrial Co., Ltd.Toshiba CorporationTitle: Content Protection for Prerecorded Media SpecificationJan. 31, 2001.

Yan-Mei Tang-Talpin and Alain Durand BD-ROM Content Protection System Threat Analysis ReportInternal Thomson document, Security Laboratory, Rennes, FranceMay 11, 2004.

The following document is an email which states that the cited norm is confidential and that only a paper version of it exists in a safe. Matsushita Electric Industrial Co. Ltdpecifications of DVD Content Scramble System for DVD Video Player, vO.9Oct. 1996.

Durand et alThe following reference is a Thomson invention disclosure, PF040156 .Method for securely binding content protection information to a content and method for verifying this binding(Corresponds to: A solution to improve secure binding between usage rules and content, Thomson Patent )Nov. 11, 2004.

\* cited by examiner

FIG.1. Typical multimedia distribution architecture

FIG.2. Illustration of the solutions

METHOD FOR PREVENTING LAUNDERING AND REPACKAGING OF MULTIMEDIA CONTENT IN CONTENT DISTRIBUTION SYSTEMS This application claims the benefit, under 35 U.S.C. §365 of International Application PCT/EP2009/002557, filed Apr. 7, 2009, which was published in accordance with PCT Article 21(2) on Oct. 15, 2009 in English and which claims the benefit of European patent application No. 08290337.8, filed Apr. 7, 2008.

FIELD OF THE INVENTION

The present invention relates to the field of content distribution systems enabling the secure distribution of multimedia content. The invention more particularly relates to a method for preventing new kinds of attacks identified by the inventors called "laundering attacks" and "repackaging attacks" that may apply to most systems used to distribute protected content.

BACKGROUND ART

Today, thanks to the availability of high bandwidth connections and efficient data compression technologies, multimedia content can be transmitted with high quality. This generates new businesses and distribution models. Unfortunately, this also gives rise to a high level of piracy. For example, digital content (music, video and software game) can be pirated by users who make copies available to others or by insiders during production processes. Content protection technologies are intended to protect against content piracy. Their proper design and correct implementation are of central importance for the entertainment industry because the incurred losses can be huge.

An investigation on prevailing content protection technologies shows that there are many variants. However, what is common in each content distribution system is the basic security functionality. Indeed, before being written to a physical support or otherwise transmitted, content is usually encrypted by content providers. As a consequence, a required step prior to illegal distribution (namely, unauthorized distribution of content in peer-to-peer file sharing systems like Kazaa or E-mule or on physical media like DVDs) or illegal consumption (namely, unauthorized use of a content legally purchased) is extracting content from its protected form. Most of the time, this means recovering the content in clear. While existing content distribution systems address this issue, they do little or nothing to prevent a pirate or an end-user to divert them from their primary purpose.

Another form of piracy is that of illegal distribution involving bit-to-bit copies or device cloning. There exist techniques (disclosed for example in "*Content Protection for Recordable Media: Introduction and Common Cryptographic Elements*", 2000. Revision 0.94, Intel Corporation, International Business Machines Corporation, Ltd. Matsushita Electric Industrial Co. and Toshiba Corporation—known as "CPRM"—or in "*Advanced Access Content System (AACS): Introduction and Common Cryptographic Element*"s, Feb. 17, 2006. Revision 0.91, Intel Corporation, International Business Machines Corporation, Ltd. Matsushita Electric Industrial Co., Toshiba Corporation, Microsoft Corporation, Sony Corporation, The Walt Disney Company, and Warner Bros—known as "AACS"—) based on a unique hardware ID making useless a number of duplication methods. The unique ID is typically encoded in or computed from the physical structure of a hardware material, generally the user's player or the physical support containing the multimedia content. These techniques have in common that this ID is located in a non-writable area of the hardware material. The unique hardware ID enables to securely bind the multimedia content to the player or physical support so that it can only be played using the corresponding player or the corresponding support. Other concurrent techniques, disclosed for example by Claudine Conrado, Franck Kamperman, Geert Jan Schrijen and Willem Jonker in "*Privacy in an identity-based DRM system*" (in *Proceedings of the 14th International Workshop on Database and Expert Systems Applications* (DEXA '03), pages 389-395, IEEE Computer Society, 2003) or by Paul Koster, Franck Kamperman, Peter Lenoir and Koen Vrielink in "*Identity-based DRM: Personal entertainment domain*" (in *Transactions on Data Hiding and Multimedia Security I*, volume 4300 of *Lecture Notes in Computer Science*, pages 104-122, Springer-Verlag, 2006), are based on authorization certificates issued by content distributors where the certificate is linked to a unique user ID.

The inventors have found that current implementations may be used as a tool for distributing information in a variety of crimes including child pornography (content laundering) or violations of copyrights (content re-repackaging). Unauthorized users can exploit distribution systems because the security chain is not addressed as a whole.

SUMMARY OF THE INVENTION

The invention relates to a method for distributing content in a content distribution system where a content M is distributed in an encrypted form $C=Enc(K_c, M)$ to players together with a distribution key $K_d$ enabling to recover the content encryption key $K_c$.

The main idea of the invention is to create a secure link between the key material and the content itself using a signature of the content.

More precisely, the method according to the invention comprises the steps of:

encrypting at a Content Packager a content using a content encryption key $K_c$ to generated an encrypted content;

sending the content encryption key $K_c$ to a Licensing Authority;

receiving from the Licensing Authority a distribution key $K_d$ containing an encryption of the content decryption key $K_c$ for a given set of authorized devices;

creating a secure link between the content encryption key $K_c$ and the content protected by this content encryption key $K_c$ using a signature of the content; and distributing the encrypted content together with the signature of the content.

According to an embodiment of the invention the step of creating a secure link between the content encryption key $K_c$ and the content protected by this content encryption key $K_c$ comprises:

signing at the Content Packager the content together with the content encryption key $K_c$ and the distribution key $K_d$ to generate a content signature.

According to another embodiment of the invention, the step of creating a secure link between the content encryption key $K_c$ and the content protected by this content encryption key $K_c$ comprises:

signing at the Content Packager the encrypted content to generate a content signature.

According to a further embodiment of the invention, the step of creating a secure link between the content encryption key $K_c$ and the content protected by this content encryption key $K_c$ comprises:

signing at the Content Packager the content to generate a content signature; wherein the content signature is used to compute the content encryption key to generate the encrypted content.

In this particular embodiment, the content signature is distributed in an encrypted form, in the distribution key $K_d$, with the encrypted content. Preferably the content signature is equal to the content encryption key.

According to another particular embodiment, the method further comprises the steps of:

generating at the Content Packager a set of hierarchical keys $K_1, \ldots, K_i$;

encrypting at the Content Packager the content encryption key $K_c$ using the first key $K_1$ in the set of hierarchical keys;

encrypting each key $K_n$, with n between 1 and i−1, of the set of hierarchical keys with the subsequent key $K_{n+1}$ in the set of hierarchical keys;

sending to the Licensing Authority, instead of the content encryption key $K_c$, the last key $K_i$ of the set of hierarchical keys;

wherein the distribution key $K_d$ received from the Licensing Authority contains an encryption of the last key $K_i$ for a given set of authorized devices;

and wherein the content signature is generated by signing, at the Content Packager, the content together with the content encryption key $K_c$, all the keys $K_1, \ldots K_i$ of the set of hierarchical keys and the distribution key $K_d$.

According to another specific embodiment, the method further comprises the steps of:

generating at the Content Packager a set of hierarchical keys $K_1, \ldots, K_i$;

encrypting at the Content Packager the content encryption key $K_c$ using the first key $K_1$ in the set of hierarchical keys;

encrypting each key $K_n$, with n between 1 and i−1, of the set of hierarchical keys with the subsequent key $K_{n+1}$ in the set of hierarchical keys;

sending to the Licensing Authority, instead of the content encryption key $K_c$, the last key $K_i$ of the set of hierarchical keys;

wherein the distribution key $K_d$ received from the Licensing Authority contains an encryption of the last key $K_i$ for a given set of authorized devices;

and wherein the content signature is generated by signing, at the Content Packager, the encrypted content together with the encryption of the content encryption key $K_c$ by the first key $K_1$ and the encryption of each key $K_n$ by its subsequent key $K_{n+1}$ in the set of hierarchical keys.

In another embodiment of the invention, the method further comprises the steps of:

generating at the Content Packager a set of hierarchical keys $K_1, \ldots, K_i$;

encrypting at the Content Packager the content encryption key $K_c$ using the first key $K_1$ in the set of hierarchical keys;

encrypting each key $K_n$, with n between 1 and i−1, of the set of hierarchical keys with the subsequent key $K_{n+1}$ in the set of hierarchical keys;

sending to the Licensing Authority, instead of the content encryption key $K_c$, the last key $K_i$ of the set of hierarchical keys;

wherein the distribution key $K_d$ received from the Licensing Authority contains an encryption of the last key $K_i$ for a given set of authorized devices;

and wherein the first key $K_1$ is generated by signing, at the Content Packager, the content encryption key $K_c$ and each key $K_m$, with m between 2 and i, of the set of hierarchical keys, is generated by signing, at the Content Packager, the preceding key $K_{m-1}$, in the set of hierarchical keys.

In any of the previous mentioned methods, the step of receiving, from the Licensing Authority, the distribution key $K_d$ may further comprise the reception of a signature of said distribution key generated by the Licensing Authority.

The invention also relates to a method for receiving content distributed according to one of the previous mentioned methods in a device able to play back the content and comprising the steps of:

verifying the content signature distributed with the content using a verification key of the Content Packager received with the distribution key $K_d$; and if the verification succeeds, obtaining from the distribution key $K_d$ the content encryption key $K_c$ using a device decryption key stored in said device and decrypting the content using the obtained content encryption key to play back the content.

In a particular embodiment, the method further comprises the step of verifying the signature of the distribution key $K_d$ using a verification key of the Licensing Authority stored in said device; and performing the subsequent steps of the above-mentioned method only if said verification of the signature of the distribution key succeeds.

BRIEF DESCRIPTION OF THE DRAWINGS

The various features of the present invention and its preferred embodiments will now be better understood by referring to the following description and the accompanying drawings in which.

DESCRIPTION OF THE PREFERRED EMBODIMENTS OF THE INVENTION

Figure 1:
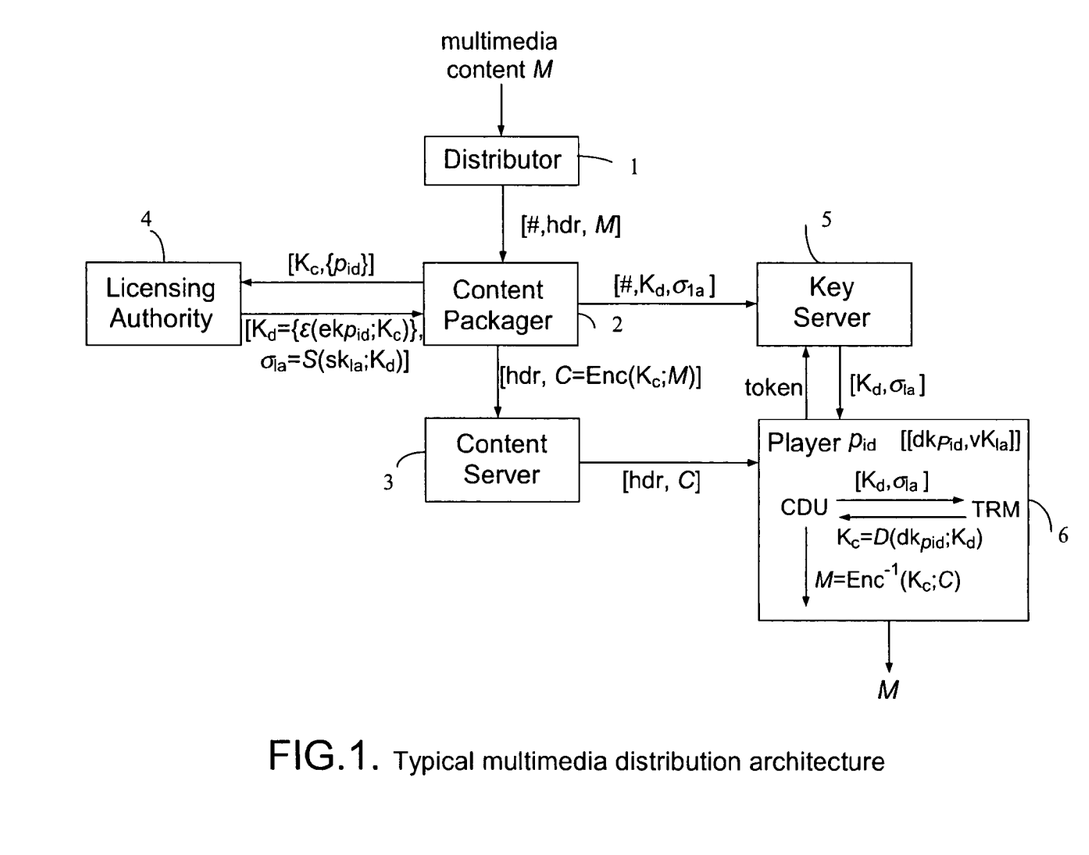
FIG. 1 illustrates an example of content distribution system.

A typical content distribution system is presented on FIG. 1. It may be subject to numerous variations and optimizations. Our aim is to introduce the key components and actors involved in the whole process: from the content owner to the content player. The architecture presented is generic and can accommodate a large variety of practical systems.

The life cycle of multimedia content can be split into four main phases:

Content creation and edition: This phase includes movie shooting or game programming, audio and graphical effects, animation, subtitles, as part of the production process before presentation of the content in its final form. Optionally, watermarks may be inserted to trace the content.

Content packaging: This phase encompasses protection of the content; e.g. by encryption, to protect it from misuse or unauthorized redistribution.

Content distribution: Once content has been prepared and protected, it has to be delivered to end-users. This can be done through a variety of existing channels like satellite, Internet or on physical media (e.g., DVD or cartridge).

Content consumption: This phase provides mechanisms for the end-user to access and render content on his(her) player. It is generally carried out within a set-top box, a game console or by a dedicated software on his(her) computer.

We do not consider the content creation phase, which is out of the scope of this invention, and we call "multimedia content" its output.

In a typical content distribution system as shown in FIG. 1, M denotes a multimedia content. The content Distributor 1 assigns a unique identifier # to M and associates with it a header hdr (containing for example the name of the content, its identifier, its encoding format, ...).

Before being distributed, multimedia content M needs to be "prepared" or, more exactly, protected. This is the role of the Content Packager 2. This involves the encryption of M under a content key, say $K_c$. Without loss of generality, we assume that M is encrypted using a symmetric encryption algorithm, noted Enc() to form the encrypted content C=Enc ($K_c$; M). Content key $K_c$ is preferably randomly generated. The content packager 2 may also add information to the header in order to retrieve the key material (e.g., a URL). The protected content and the corresponding header, namely [hdr, C], are then made available on a Content Server 3.

The key material necessary to decrypt the content is made available on a Key Server 5. Its management and storage are described below. But before that, we need to introduce the Licensing Authority 4.

A multimedia content packaged by a content packager cannot be read on any player, such as Player 6 on FIG. 1. The Player must conform to certain requirements enacted by a Licensing Authority 4 which serves as a trusted third party. The Licensing Authority 4 possesses a matching pair of public/private keys ($vk_{la}$, $sk_{la}$). Private key $sk_{la}$ is typically used to digitally sign while public key $vk_{la}$ is preferably used to check the validity of a signature issued by the Licensing Authority.

If a player manufacturer wishes to produce and sell players that can read content, it must request player keys to the Licensing Authority 4. If Licensing Authority assesses the Player 6 to be compliant, the player manufacturer receives one or several player keys. A given player key may be unique to one player or shared among a family of same players. We let $p_{id}$ denote a player identifier. In more detail, for each $p_{id}$, the Licensing Authority 4 generates a pair of encryption/decryption keys, say ($ekp_{id}$, $dkp_{id}$), and provides the player manufacturer with $dkp_{id}$. Decryption key $dkp_{id}$ and verification key $vk_{la}$ (i.e. the public key of the Licensing Authority) are stored in each player $p_{id}$ such as Player 6.

The Licensing Authority 4 maintains a list L containing all compliant players identifiers and corresponding encryption keys ($p_{id}$, $ekp_{id}$). If, at a latter time, a player is no longer compliant (e.g., following a security flaw), the Licensing Authority removes from list L the corresponding entry to revoke the player (revocation mechanism).

The encryption of multimedia content M is preferably (at least) a two-level process. The Content Packager 2 first encrypts M under a random content key $K_c$ to form C. Content key $K_c$ is also encrypted to form what is called a "distribution key", say $K_d$. This second level of key enables the distribution of a same protected content to different players.

The encryption of $K_c$ proceeds as follows. The Content Packager 2 sends to the Licensing Authority 4 a set of players identifiers, P={$p_{id}$}, the multimedia content is intended for. Next, the Licensing Authority checks that the set of intended players is valid, namely that each $p_{id}$ of P is included in the list L. If so, the Licensing Authority issues the distribution key:

$$K_d = \{\epsilon(ekp_{id}; K_c)\}_{p_{id} \in P},$$

that is, the encryption of $K_c$ under encryption key $ekp_{id}$ using encryption algorithm $\epsilon()$ for each $p_{id}$ in P.

It is to be noted that when the multimedia content is intended to a huge number (several millions for example) of players, the generation of $K_d$ can be optimized using broadcast encryption techniques disclosed for example by Amos Fiat and Moni Naor, in "Broadcast encryption" (In D. R. Stinson, editor, *Advances in Cryptology—CRYPTO '93*, volume 773 of *Lecture Notes in Computer Sciences*, pages 480-491. Springer-Verlag, 1994.) or by Dalit Naor, Moni Naor, and Jeffrey B. Lotspiech. in "Revocation and tracing schemes for stateless receivers" (In *Advances in Cryptology—CRYPTO 2001*, volume 2139 of *Lecture Notes in Computer Science*, pages 41-62. Springer-Verlag, 2001). But to keep the presentation simple, we consider $K_d$ as the separate encryption of $K_c$ under the key $ekp_{id}$ of each player in P.

Preferably, the licensing authority also signs the distribution key, $K_d$, using signing algorithm S() with its private signing key $sk_{la}$ to get the signature $\sigma_{la} = S(sk_{la}; K_d)$. $K_d$ and $\sigma_{la}$ are sent to the Content Packager 2. These two quantities $K_d$ and $\sigma_{la}$ together with content identifier # are stored on a Key Server 5.

Regarding content consumption (or play-back), we consider two types of distribution channels:

Electronic distribution: If a user wants to play a protected content C (with header hdr and identifier #) retrieved from the Content Server 3, (s)he first needs to purchase the content to some retailer. This purchase process is out of the scope of the present invention and may be done using electronic payment systems, pre-paid "electronic money" stored in a smart card, etc. This purchase is materialized by a "token", obtained by the user, proving that the user has the right to access the content. This token is then sent to the Key Server 5 to obtain the distribution key $K_d$ and its signature $\sigma_{la}$. This key and signature material may be sent in a license (vocabulary used in DRM—Digital Rights Management—systems or in an ECM (Entitlement Control Message—vocabulary used in Conditional Access systems)

Physical media: In this case, there is no distinction between the Content Server 3 and the Key Server 5. Both the protected content C and the corresponding key material, $K_d$ and $\sigma_{la}$, are stored on a physical media (e.g., a DVD or a cartridge). The user simply purchases a copy of the physical media.

It remains to explain how a multimedia content is played from [C, $K_d$, $\sigma_{la}$]. A Player 6 comprises two main components: a content decryption unit (CDU) and a tamper-resistant module (TRM). The tamper-resistant module TRM embeds the player decryption key $dkp_{id}$ and the public key of the Licensing Authority, $vk_{la}$. On input [$K_d$, $\sigma_{la}$], the tamper-resistant module first verifies signature $\sigma_{la}$ using verification key $vk_{la}$. If the verification succeeds, it computes the content key as $K_c = D(dkp_{id}; K_d)$ using decryption key $dkp_{id}$ and decryption algorithm D(). From $K_c$ and C, the content decryption unit CDU then recovers (plain) multimedia content M=$Enc^{-1}$($K_c$; C), which is played by the Player 6.

A content distribution system as disclosed in FIG. 1 may be subject to different kinds of attacks. We present below two classes of attacks where an attacker can produce protected multimedia content without interacting with the Licensing Authority that is supposed to provide with the necessary key material. These attacks open the door to illegal distribution of (pirated) multimedia content that cannot be distinguished from genuine one.

In the following, we distinguish three categories of players:

Compliant players: Devices or softwares that conform to the system specifications, that have keys obtained from the Licensing Authority and whose player identifiers $p_{id}$ are present in list L maintained by the Licensing Authority.

Conformant but non-compliant players: Devices or softwares that conform the system specifications, that have keys (decryption key $dkp_{id}$ and verification key $vk_{la}$ obtained or not from the Licensing Authority) but that are not present in list L. This includes implementations that conform to the specifications but did not qualify to the Licensing Authority validation process (in this case, the corresponding encryptions keys $ekp_{id}$ have never been in the list L) or revoked devices (in this case, the corresponding encryptions keys $ekp_{id}$ have been removed from the list L).

Non-conformant players: Devices or softwares that do not conform to the system specifications and are thus unable to play protected multimedia content.

For the sake of clarity, in the following, a player that can play protected content, whether it is compliant or not, will be referred to as a conformant player. This includes the two first categories.

We also make the assumption that an efficient revocation mechanism is in place since it supposes that compromised players are immediately removed from the list L. Furthermore, as a first approach, we suppose that conformant players are unable to handle clear content (i.e., they can only consume protected multimedia content). This approach corresponds for instance to the following cases:

Secure Peer-to-Peer content distribution systems: The purpose of such systems is to be used only to distribute protected multimedia content. It is thus an important feature in such systems to disable the distribution of clear content.

Game consoles: in most of the platforms it is not possible to play unprotected games on such consoles.

The two classes of attacks, referred to as "content laundering" and "content repackaging" attacks will now be described. For both type of attacks, we make the assumption that the attacker knows one or several content keys $K_c$.

The content laundering attack consists in transforming clear content into protected content so that it can be played on conformant players. Content source is not specified but is generally illegal like a Peer-to-Peer network for example. Here are some example scenarios:

Pirates may be willing to perform the attack because it augments the interest of their offer. For instance, a mafia organization may "hide" their pirated DVDs to go through customs controls. Clear content on a DVD may appear suspect contrarily to protected one.

In secure Peer-to-Peer distribution systems, content is encrypted and their source is centralized. Using laundering attack, a secure Peer-to-Peer may be hijacked by criminals and terrorists. This permits them to introduce and exchange video e.g. on child pornography or terrorist messages. In this case, detection will most probably fail because the encryption used by the system will hide suspect videos.

A user having developed its own video game (on a proprietary game platform) may want to play it on a compliant device (game console) because it offers a better user experience.

A user may want to enjoy other games downloaded from the Internet because (s)he finds a widest choice of games (even at low price), which cannot be found on legal cartridges. It could be games of older console generations for example.

The attack itself is now described.

We suppose that a pirate gets a copy of pirated content P that he wants to launder. This pirated content P is typically in clear. Per our initial assumption, the pirate knows as well at least one content key $K_c$ and associated hdr and # corresponding to a genuine content.

The pirate, using $K_c$, encrypts P and obtains the laundered content L=Enc($K_c$; P). The pirate then distributes L together with the header hdr and identifier #.

A user having a conformant player who receives this laundered content L can obtain, thanks to the header hdr, the corresponding distribution key $K_d$ and accompanying signature $\sigma_{la}$ from the Key Server 5. The signature verification being correct, the player will decrypt $K_d$ to obtain $K_c$; and so it will decrypt L to get P. There is actually no means for the player to detect that it is decrypting a laundered content.

It is to be noted that this attack can be performed as soon as a pirate knows some content key $K_c$ and associated hdr and #. The same content key $K_c$ can then be applied to any pirated content.

The content repackaging attack allows an attacker to re-encrypt multimedia content using a different content key. Re-packaged multimedia content can be redistributed and played back by conformant players.

This kind of attack allows a pirate to propose a more attractive offer to the end-user than the original ones. Here are some example scenarios where the attack can be useful for the pirate:

In geographical black-out scenarios: For some sport games, the region where the match is played is blacked out to encourage people to go to the match. Performing the attack, the pirate may propose the match to people from the blacked-out region.

In situations where a number of devices have been revoked, the pirate may repackage the content using keys of revoked devices to allow revoked devices to also access to the content.

A pirate can repackage games or movies in order to circumvent zoning control: he will be able to make available content in geographic regions that would have had to wait several months else.

A pirate can repackage several pieces of content on the same support. He buys for example three protected movies that he recovers in the clear form. Next, he repackages them on the same support that he can sell to millions of users at an attractive price. He can for instance sell three movies at the price of one.

To perform the attack, the pirate obtains from a legal distribution channel the content $M_a$ he wants to re-distribute. $M_a$ is distributed through this legal distribution channel in encrypted form $C_a$ and distributed together with its header $hdr_a$ and identifier $\#_a$.

The attacker has then to recover the corresponding content key $K_{ca}$. Using $K_{ca}$, he is able to recover the clear content $M_a$. Then, using the assumption he knows some other content key $K_c$ and corresponding headers hdr and identifier #, he re-encrypts $M_a$ using $K_c$ to obtain repackaged content R=Enc($K_c$; $M_a$). He may then redistribute R together with hdr and #, as for the laundering attack.

Conformant players will be able to recover the clear content $M_a$ from R in the same way as for laundered content.

A possible countermeasure to prevent laundering attacks would be to sign clear content M before distributing it. Unless getting content with its signature (e.g., from an insider, i.e. a person working within the company that owns the multimedia content), the pirate cannot dispose of the signature of the content. As a consequence, any pirated content obtained from the "analog hole" (e.g., cam-corded content) cannot be laundered since it is not accompanied by a signature.

However, this countermeasure is inefficient in the case of repackaging attacks because these attacks work perfectly on signed content. As the attacker gets the content from a legal distribution channel, he obtains content signature together with the content. He can thus repackage it and re-distribute it.

Both attacks (content laundering and content repackaging) suppose the pirate has been able to recover at least one content encryption key $K_c$. Repackaging attacks require even to recover such a key for each new content to repackage. However these situations are not unrealistic for the reasons set forth below.

Even if a tamper-resistant module is used in each player to protect infrastructure keys and data, it cannot be used to manipulate the content itself because of its limited capacity both in terms of memory and of computational power. Content encryption keys are then manipulated in standard memory and are thus more sensitive to implementation attacks.

In broadcast systems (e.g., broadcast television or distribution on DVD-ROMs), a given content is encrypted under the same content encryption $K_c$ even if it is distributed to many players. In that case, the key is more exposed and disposing of one player with a "less-secure" implementation is enough to recover $K_c$. Other means can also be used to obtain the content encryption key; for example, from insiders, i.e., people working within the company that owns the multimedia content, using social engineering techniques.

In the above-described attacks, it is assumed that the attacker is only able to get access to content encryption keys $K_c$. This assumption is intentionally chosen to be weak as having $K_c$ is enough for laundering and repackaging attacks. A most powerful attacker would obtain keys at a higher level in the hierarchy (e.g., a player key) that anyway allows the re-computation of the content encryption key.

Finally, attacks feasibility does not depend on the encryption algorithm used to protect $K_c$. More particularly, if the content encryption key $K_c$ is asymmetrically encrypted, the attacks still work. The pirate has still to get one $K_c$ and replicate the corresponding identifier and distribution key $K_d$.

The ability to perform these attacks comes from the fact that there is no secure link between the encrypted multimedia data and the key material: Any key $K_c$ can be used to encrypt a given piece of content. Therefore, a content key can be applied to a pirated content or to a content to which it was not intended and may violate the initial content copyright.

We propose here different tracks to remedy to this problem, all the proposed solutions being based on the creation of a secure link between the content key and the content it is protecting. If this secure link exists, none of the aforementioned attacks will work anymore.

All solutions imply to sign large amounts of data. Consequently, signature schemes with appendix are preferably used. In the following, $\sigma$ (or $\Sigma$) will denote the signature only. We refer the reader to the following publication "How to sign digital streams" (Rosario Gennaro and Pankaj Rohatgi, *Information and Computation*, 165(1):110-116, 2001, earlier version in Proc. of CRYPTO'97) for an efficient signature method.

A first proposed solution to counter the laundering and repackaging attacks is to sign multimedia content along with all the keys involved in the content protection. Namely, to sign the content concatenated with all the keys in the key hierarchy.

Figure 2:
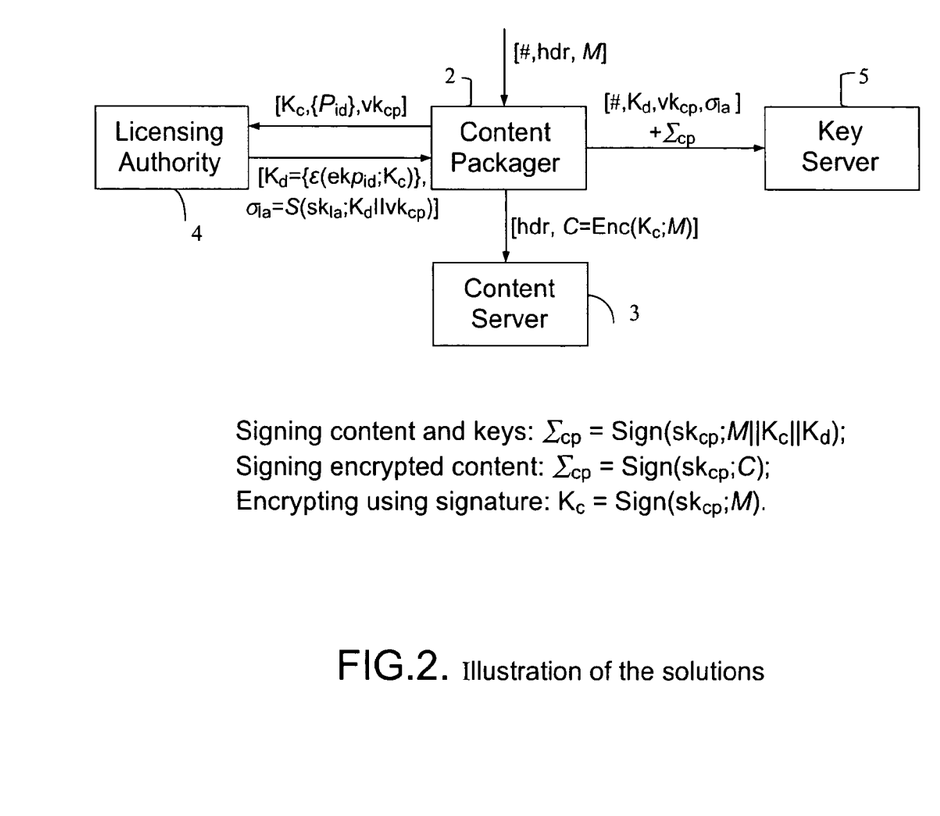
FIG. 2 illustrates the different embodiments of the invention.

FIG. 2 shows the content distribution system of FIG. 1 (wherein the same elements bear the same reference numbers) in which the proposed solutions are implemented.

According to the first embodiment of the invention, when receiving the content M, the Content Packager 2 generates $K_c$ and requests the Licensing Authority to send a distribution key $K_d$ for a given set of players $P=\{p_{id}\}$. Upon receiving $K_d$, the Content Packager 2 signs it together with the content M and the content key $K_c$ with its private key $sk_{cp}$ to obtain $\Sigma_{cp}=\text{Sign}(sk_{cp}; M\|K_c\|K_d)$. $\Sigma_{cp}$ is then made available on the Key Server 5 together with auxiliary data [#, $K_d$, $vk_{cp}$, $\sigma_{la}$], # denoting the content identifier, $K_d$ denoting the distribution key, $vk_{cp}$ denoting the public key of the Content Packager, used as verification key to verify the signature $\Sigma_{cp}$ and $\sigma_{la}$ denoting the signature of the distribution key generated by the Licensing Authority. The signature $\sigma_{la}$ may also be calculated by signing the distribution key $K_d$ concatenated to:

the verification key $vk_{cp}$ of the Content Packager (as shown in FIG. 2—$\sigma_{la}=S(sk_{la}; K_d\|vk_{cp})$, an identity of the Content Packager; or an identity of the Licensing Authority.

At play-back time, each player in the set $P=\{p_{id}\}$ verifies signature $\Sigma_{cp}$ using the verification key $vk_{cp}$ received together with the key material $K_d$, $\sigma_{la}$. The signature $\sigma_{la}$ is also verified in the player using the verification key $vk_{la}$. The multimedia content is played if and only if the verification of both signatures $\Sigma_{cp}$ and $\sigma_{la}$ succeeds.

The secure binding is effective as $K_d$ cannot be used to distribute another content M' (laundering is countered) and another key material $K_d'$ associated to content [#', hdr', C'] cannot be used to distribute M (repackaging is countered).

In the above example, two keys $K_c$ and $K_d$ were added to the content M in the signature $\Sigma_{cp}$ because there are only two steps of encryption. If more encryption steps are involved, which is very likely (such as in the systems previously mentioned and known as CPRM or AACS), all the keys in the key hierarchy must be added to content before generating the signature at the Content Packager 2. For example, if the content encryption key $K_c$ is itself encrypted by a key $K_1$, which is encrypted by $K_2$, etc. until $K_i$ which itself is encrypted in a distribution key $K_d$ for a given set of players $P=\{p_{id}\}$. then the content signature $\Sigma_{cp}$ is computed as follows:

$$\Sigma_{cp}=\text{Sign}(sk_{cp}; M\|K_c\|K_1\|K_2\|\ldots\|K_i\|K_d)$$

In such a multi-level encryption scenario, a preferred embodiment consists in having the Content Packager 2 generating the content key $K_c$ used to encrypt the content M, and the remaining keys of the key hierarchy until $K_i$. In other words, the following steps are performed at the Content Packager 2: generation of $K_c$, encryption of the content M by $K_c$ to obtain $C=\text{Enc}(K_c, M)$, generation of $K_1$, encryption of $K_c$ by $K_1$ to obtain $E(K_1; K_c)$, generation of $K_2$, encryption of $K_1$ by $K_2$, etc. until the generation of $K_i$. It should be noted that the encryption algorithm E() may be the same or may by different from Enc(). The last key $K_i$ of the key hierarchy is then sent by the Content Packager 2 to the Licensing Authority 4 to obtain from the Licensing Authority the encryption of $K_i$ in the distribution key $K_d$ for a given set of players $P=\{p_{id}\}$.

When the content is distributed, the Content Packager 2 sends to the Content Server 3 the following content:

[hdr, $C=\text{Enc}(K_c; M)$, $E(K_1; K_c)$, $E(K_2; K_1)$, ... $E(K_i; K_{i-1})$]

and the key material obtained from the Licensing Authority together with auxiliary data [#, $K_d$, $vk_{cp}$, $\sigma_{la}$] and with the signature $\Sigma_{cp}$ is sent to the Key Server 5.

A second proposed solution to counter the laundering and repackaging attacks is to use the signature on the encrypted version of the multimedia content instead of the one on the clear version. According to this embodiment, when receiving M, the Content Packager 2 first encrypts M, using the content encryption key $K_c$, to generate $C=Enc(K_c; M)$, and signs C with its private key $sk_{cp}$ to obtain $\Sigma_{cp}=Sign(sk_{cp}; C)$. The Licensing Authority 4 next issues the key material [#, $K_d$, $vk_{cp}$, $\sigma_{la}$] which is sent, together with $\Sigma_{cp}$, to the Key Server 5 in order to distribute the content to a given set of players $P=\{p_{id}\}$.

At play-back time, the content decryption unit CDU of the Player (not shown on FIG. 2) verifies signature $\Sigma_{cp}$ using the verification key $vk_{cp}$. The signature $\sigma_{la}$ is also verified in the player using the verification key $vk_{la}$. If both signatures are valid, the content decryption unit recovers multimedia content that is played. If the content signature $\Sigma_{cp}$ is invalid the multimedia content is not played. Two scenarios are then possible: either $K_c$ is not authentic, or content M has been changed. If $K_c$ is not authentic but $K_d$ is ($K_d$ is considered authentic is the verification of the signature $\sigma_{la}$ succeeds), then $K_d$ has been retrieved from another protected multimedia content [hdr', C'] and used to protect this new content M. We are in front of a repackaging attack. If content is not "authentic" then we are in front of a laundering attack. Consequently, the binding is effective using this solution.

Again, if there are more than two encryption levels, then the signature must be applied to the whole key hierarchy. For example, if the content encryption key $K_c$ is itself encrypted by a key $K_1$, which is encrypted by $K_2$, etc. until $K_i$ which itself is encrypted in a distribution key $K_d$ for a given set of players $P=\{p_{id}\}$, then the content signature $\Sigma_{cp}$ is computed as follows:

$$\Sigma_{cp}=Sign(sk_{cp}; C\|E(K_1; K_c)\|E(K_2; K_1)\| \ldots \|E(K_i; K_{i-1}))$$

It is not necessary to include $E(K_d;K_i)$ (or $\{\epsilon(ekp_{id}; K_i)\}_{p_{id} \in P}$) in the signature $\Sigma_{cp}$ since $K_d$ is already authenticated by the signature of the Licensing authority $\sigma_{la}$.

A third proposed solution to counter the laundering and repackaging attacks is, instead of generating $K_c$ at random, to make it depend on the signature of the multimedia content. When receiving M, the content packager first signs it with private key $sk_{cp}$, $\Sigma_{cp}=Sign(sk_{cp}; M)$. Next, the content packager chooses $K_c$ as the content signature value, $K_c=\Sigma_{cp}$, and encrypts M under it, $C=Enc(K_c; M)$. Practically, the content key $K_c$ is not necessarily equal to the signature $\Sigma_{cp}=Sign(sk_{cp}; M)$, particularly if $K_c$ and $\Sigma_{cp}$ are not coded with the same number of bits, but $K_c$ can be computed from $\Sigma_{cp}$ for example by taking the first 128 bits of $\Sigma_{cp}$ if the signature is calculated on 256 bits.

The distributed protected multimedia content becomes [hdr, C, #, $K_d$, $vk_{cp}$, $\sigma_{la}$]. There is no need to make signature $\Sigma_{cp}$ available as it is already present in encrypted form inside $K_d$. It is to be noted that when the content is distributed on a physical medium (optical disc for example), all the elements [hdr, C, #, $K_d$, $vk_{cp}$, $\sigma_{la}$] are stored on the medium itself. In contrast, when the content is distributed via broadcast (such as satellite, terrestrial, . . . ) or broadband (such as Internet) distribution networks, the content and its header ([hdr, C]) are sent from the Content Server 3 to the player while the key material [#, $K_d$, $vk_{cp}$, $\sigma_{la}$] is sent from the Key Server 5 to the player when the player is authorized to access the content.

When a player receives the protected content, it verifies the signature $\sigma_{la}$ using $vk_{la}$. If $\sigma_{la}$ is valid, the player computes the content key as $K_c=D(dkp_{id}; K_d)$ using decryption key $dkp_{id}$. From $K_c$ and C, it recovers then multimedia content $M=Enc^{-1}(K_c; C)$. Finally, it verifies content signature $\Sigma_{cp}$ ($=K_c$) using the content M and verification key $vk_{cp}$. The multimedia content is played if and only if the verification succeeds.

As before, if the last authentication fails then most probably a laundering or repackaging attack occurred. If there are more than two encryption levels, then the signature must be applied to the whole key hierarchy. For example, if the content encryption key $K_c$ is itself encrypted by a key $K_1$, which is encrypted by $K_2$, etc. until $K_i$ which itself is encrypted in a distribution key $K_d$ for a given set of players $P=\{p_{id}\}$, then:

$K_1$ is computed as: $K_1=Sign(sk_{cp}; K_c)$ and each key $K_n$ of the hierarchy (with n between 2 and i) is computed as:

$$K_n=Sign(sk_{cp}; K_{n-1}).$$

Thanks to the proposed solutions, the vulnerability of current content distribution systems to laundering attacks or to repackaging attacks can be circumvented.

Although the description above has been made with reference to asymmetric cryptography (public/private keys $vk_{la}$, $sk_{la}$ of the Licensing Authority and $vk_{cp}$, $sk_{cp}$ of the Content Packager) for generating and verifying signatures, other embodiments of the invention may be envisaged. For example, if symmetric cryptography is used, the Licensing Authority will have only one secret key $vk_{la}=sk_{la}$ used to generate and to verify MAC—Message Authentication Codes—instead of signatures.

Similarly, the pair of encryption/decryption keys ($ekp_{id}$, $dkp_{id}$) generated by the Licensing Authority for each compliant player can be replaced, in an alternative embodiment, by a single secret key ($ekp_{id}=dkp_{id}$) used to encrypt and to decrypt the content key. In this case, this secret key must be stored in a secure memory of the Player.

In both cases, the transmission of keys used to generate the MAC shall be secured, i.e. keys shall be transmitted in an encrypted manner, using for instance the same distribution method as content encryption key $K_c$.

The invention claimed is:

1. A method for distributing content in a content distribution system comprising:
   signing at a content packager the content to obtain a content signature;
   encrypting at the content packager a content using a content encryption key to generate an encrypted content, wherein at least part of the content signature is used as the content encryption key for generating the encrypted content;
   sending the content encryption key and a list of players from the content packager over a network to a licensing authority;
   receiving from the licensing authority at the content packager a distribution key containing an encryption of the content decryption key for a given set of authorized devices among the list of players; and
   distributing the encrypted content and the distribution key;
   generating at the content packager a set of hierarchical keys $K_1, \ldots, K_i$;
   encrypting at the content packager the content encryption key using the first key $K_1$ in the set of hierarchical keys;
   encrypting each key $K_n$, with n between 1 and i−1, of the set of hierarchical keys with the subsequent key $K_{n+1}$ in the set of hierarchical keys;
   sending to the licensing authority, instead of the content encryption key, the last key $K_i$ of the set of hierarchical keys;

wherein the distribution key received from the licensing authority contains an encryption of the last key $K_i$ for a given set of authorized devices; and wherein the first key $K_1$ is generated by signing, at the content packager, the content encryption key and each key $K_m$, with m between 2 and i, of the set of hierarchical keys, is generated by signing, at the content packager, the preceding key $K_{m-1}$ in the set of hierarchical keys.

2. Method according to claim 1, wherein a part of the content signature is distributed in an encrypted form, in the distribution key, with the encrypted content.

3. The method according to claim 1, wherein receiving the distribution key from the licensing authority further comprises receiving a signature of said distribution key generated by the licensing authority.

4. The method for receiving content distributed according to the method of claim 3 in a device able to play back the content comprising:
  verifying the content signature distributed with the content using a verification key of the content packager received with the distribution key; and
  when the verification succeeds, obtaining from the distribution key the content encryption key using a device decryption key stored in said device and decrypting the content using the obtained content encryption key to play back the content.

5. The method for receiving content distributed according to the method of claim 3 further comprising:
  verifying the content signature distributed with the content using a verification key of the content packager received with the distribution key;
  verifying the signature of the distribution key using a verification key of the licensing authority stored in said device; and
  when said verification of the content signature and signature of the distribution key succeeds, obtaining from the distribution key the content encryption key using a device decryption key stored in said device and decrypting the content using the obtained content encryption key to play back the content.

6. The method according to claim 1, wherein another part of the content signature is distributed in clear with the encrypted content.

7. A content packager for generating an encrypted content comprising at least one processor is further configured to:
  sign the content to obtain a content signature;
  encrypt a content using a content encryption key to generate an encrypted content, wherein at least part of the content signature is used as the content encryption key for generating the encrypted content;
  send the content encryption key and a list of players over a network to a licensing authority;
  receive from the licensing authority a distribution key containing an encryption of the content decryption key for a given set of authorized devices among the list of players; and
  send to a content server the encrypted content and the distribution key;
  generate a set of hierarchical keys $K_1, \ldots, K_i$;
  encrypt the content encryption key using the first key $K_1$ in the set of hierarchical keys;
  encrypt each key $K_n$, with n between 1 and i-1, of the set of hierarchical keys with the subsequent key $K_{n+1}$ in the set of hierarchical keys; and
  send, to the licensing authority, instead of the content encryption key, the last key $K_i$ of the set of hierarchical keys;

wherein the distribution key received from the licensing authority contains an encryption of the last key $K_i$ for a given set of authorized devices; and the first key $K_1$ is generated by signing, at the content packager, the content encryption key and each key $K_m$, with m between 2 and i, of the set of hierarchical keys, is generated by signing, at the content packager, the preceding key $K_{m-1}$ in the set of hierarchical keys.

8. A content packager content packager according to claim 7, wherein the at least one processor is further configured to distribute a part of the content signature in an encrypted form, in the distribution key, with the encrypted content.

9. The content packager according to claim 7, wherein the at least one processor is further configured to receive a signature of the distribution key generated by the licensing authority.

10. The content packager according to claim 7, wherein the at least one processor is further configured to
  verify the content signature distributed with the content using a verification key of the content packager received with the distribution key; and
  when the verification succeeds, obtain from the distribution key the content encryption key using a device decryption key stored in said device and decrypting the content using the obtained content encryption key to play back the content.

11. The content packager according to claim 7, wherein the at least one processor is further configured to
  verify the content signature distributed with the content using a verification key of the content packager received with the distribution key;
  verify the signature of the distribution key using a verification key of the licensing authority stored in said device; and
  when said verification of the content signature and signature of the distribution key succeeds, obtaining from the distribution key the content encryption key using a device decryption key stored in said device and decrypting the content using the obtained content encryption key to play back the content.

12. The content packager according to claim 7, wherein the at least one processor is further configured to distribute another part of the content signature in clear with the encrypted content.

13. A method for distributing content in a content distribution system comprising:
  receiving over a network, at a licensing authority, a content encryption key and a list of players from a content packager, said encryption key being generated using at least part of a content signature and is used in generating an encrypted content;
  comparing each player on the list to a stored list of compliant players;
  generating a distribution key for each player determined to be on the list of compliant players, the distribution key including an encryption of the content encryption key and for use by each player to verify content;
  signing, at the licensing authority, each distribution key with a signing key to obtain a signature; and
  sending from the Licensing Authority to a content packager the distribution keys and signature.

14. The method according to claim 13 further comprising:
  receiving at the licensing authority from the content packager, a last key $K_i$ in a set of hierarchical keys $K_1, \ldots, K_i$, wherein the content encryption key is has been encrypted using the first key K1, and wherein each key $K_n$, with n between 1 and i-1, of the set of hierarchical keys has been encrypted with the subsequent key $K_{n+1}$ in the set of hierarchical keys;

wherein the distribution key sent from the licensing authority to the content packager contains an encryption of the last key $K_i$ for a given set of authorized devices.

15. The method according to claim 13, further comprising:

removing, by the licensing authority, players from the list of compliant players that are no longer compliant; and upon assessing a player to be compliant by the licensing authority, receiving a player key from the compliant player and adding the compliant player to the list of compliant players.

16. A licensing authority for authorizing playing of content by a player, the licensing authority comprising:

a storage for storing a list of compliant players; and at least one processor configured to:

receive over a network, at the licensing authority, a content encryption key and a list of players from a content packager, said encryption key being generated using at least part of a content signature and being used in generating an encrypted content;

compare each player on the list to a stored list of compliant players;

generate a distribution key for each player determined to be on the list of compliant players, the distribution key including an encryption of the content encryption key and for use by each player to verify content;

sign, at the licensing authority, each distribution key with a signing key to obtain a signature; and send from the licensing authority to a content packager the distribution keys and signature.

17. The licensing authority according to claim 16 wherein the at least one processor is configured to;

receive, from the content packager, a last key $K_i$ in a set of hierarchical keys $K_1, \ldots, K_i$, wherein the content encryption key is has been encrypted using the first key K1, and wherein each key $K_n$, with n between 1 and i-1, of the set of hierarchical keys has been encrypted with the subsequent key $K_{n+1}$ in the set of hierarchical keys; and wherein the distribution key sent from the licensing authority to the content packager contains an encryption of the last key $K_i$ for a given set of authorized devices.

18. The licensing authority according to claim 16, wherein the at least one processor is further configured to:

assess whether a player is compliant; and upon assessing a player that is no longer compliant, remove the player from the list of compliant players; and upon assessing a player is compliant, receive a player key and add the compliant player to the list of compliant players.

* * * * *